(12) United States Patent
Wright et al.

(10) Patent No.: US 10,273,694 B2
(45) Date of Patent: Apr. 30, 2019

(54) ROOFTOP SUPPORT SYSTEM

(71) Applicant: ZSI-Foster, Inc., Canton, MI (US)

(72) Inventors: Thomas D. Wright, Belleville, MI (US); Jeffrey R. Henry, Ballston Lake, NY (US)

(73) Assignee: ZSI-Foster, Inc., Canton, MI (US)

( * ) Notice: Subject to any disclaimer, the term of this patent is extended or adjusted under 35 U.S.C. 154(b) by 4 days.

(21) Appl. No.: 15/449,062

(22) Filed: Mar. 3, 2017

(65) Prior Publication Data
US 2018/0251981 A1 Sep. 6, 2018

(51) Int. Cl.
| | | |
|---|---|---|
| *E04D 13/00* | (2006.01) | |
| *F16L 3/00* | (2006.01) | |
| *F16L 1/024* | (2006.01) | |
| *F16L 3/223* | (2006.01) | |
| *F16M 13/02* | (2006.01) | |
| *F16L 3/24* | (2006.01) | |
| *F16L 3/227* | (2006.01) | |

(52) U.S. Cl.
CPC ............ *E04D 13/00* (2013.01); *F16L 1/0246* (2013.01); *F16L 3/00* (2013.01); *F16L 3/2235* (2013.01); *F16M 13/02* (2013.01); *F16L 1/0243* (2013.01); *F16L 3/227* (2013.01); *F16L 3/24* (2013.01)

(58) Field of Classification Search
CPC ....... F16L 3/24; F16L 3/00; F16L 3/20; F16L 3/2235; F16L 3/221; F16L 1/0246; F16L 3/227; F16M 5/00; F16M 11/22; F16M 11/00
USPC ....... 248/68.1, 346.01, 346.02, 678, 49, 237
See application file for complete search history.

(56) References Cited

U.S. PATENT DOCUMENTS

| | | | | | |
|---|---|---|---|---|---|
| 2,047,493 | A | * | 7/1936 | Saurer .................. | B29C 69/001 105/422 |
| 3,769,190 | A | * | 10/1973 | Deem ..................... | C23F 13/02 204/196.15 |
| 3,944,175 | A | * | 3/1976 | Kearney ................. | E21F 17/02 248/59 |

(Continued)

FOREIGN PATENT DOCUMENTS

JP 08042761 A * 2/1996 ................ F16L 3/24

OTHER PUBLICATIONS

U.S. Appl. No. 29/591,881, filed Jan. 25, 2017, Wright et al.

*Primary Examiner* — Jonathan Liu
*Assistant Examiner* — Taylor L Morris
(74) *Attorney, Agent, or Firm* — Harness, Dickey & Pierce, P.L.C.

(57) ABSTRACT

A rooftop support system including at least one support block. The support block includes a base configured to rest on the rooftop, and the base has a first base section and a second base section separated by a U-shaped recess that defines a first gripping feature. The support block includes first and second sidewalls unitary with the base and extending along a length of the support block, and the first and second sidewalls each define a second gripping feature. The support block also includes third and fourth sidewalls unitary with the base and extending along a width of the support block, and the third and fourth sidewalls each define a third gripping feature. An upper surface of the support block defines an elongate channel, and a pair of apertures are formed in the elongate channel with a coupling feature embedded therein.

16 Claims, 6 Drawing Sheets

(56) References Cited

U.S. PATENT DOCUMENTS

| | | | | |
|---|---|---|---|---|
| 4,354,655 A * | 10/1982 | Hengst | F16M 7/00 248/676 |
| 4,505,449 A * | 3/1985 | Turner | F16M 5/00 248/346.03 |
| 4,594,021 A * | 6/1986 | Schafer | E01C 11/223 404/14 |
| 5,072,901 A * | 12/1991 | Scott | F16L 1/06 248/49 |
| 5,102,073 A * | 4/1992 | Lestenkof, Jr. | F16L 3/227 138/106 |
| 5,217,191 A * | 6/1993 | Smith | F16L 3/18 248/49 |
| 5,303,887 A * | 4/1994 | Hasty | F16L 3/227 248/67.5 |
| 5,816,554 A * | 10/1998 | McCracken | E04F 15/02458 248/346.01 |
| 5,829,718 A * | 11/1998 | Smith | F16L 3/14 248/55 |
| 5,876,000 A * | 3/1999 | Ismert | E03C 1/021 248/65 |
| 5,887,831 A * | 3/1999 | Post | H02G 3/26 248/237 |
| 6,142,440 A * | 11/2000 | Gratz | A47F 7/17 108/51.11 |
| 6,186,468 B1 * | 2/2001 | Schlegel | F16M 5/00 248/346.01 |
| 6,250,034 B1 * | 6/2001 | Hulsey | E04D 3/3603 411/545 |
| 6,250,591 B1 * | 6/2001 | Cunningham | F16L 3/2235 248/65 |
| 6,481,921 B1 * | 11/2002 | Fenimore | G09F 19/22 404/7 |
| 6,518,499 B1 * | 2/2003 | Kessler | F16M 5/00 174/37 |
| 6,889,944 B2 * | 5/2005 | Brandzel | F16L 3/222 248/65 |
| 6,892,993 B2 * | 5/2005 | Palmer | A47B 96/021 248/346.01 |
| 6,976,435 B2 * | 12/2005 | Lucas | B65D 71/0088 108/51.11 |
| 7,168,210 B2 * | 1/2007 | Krovats | E04D 13/12 52/167.1 |
| D564,958 S * | 3/2008 | Almy | F16L 3/127 D13/102 |
| 7,441,731 B2 * | 10/2008 | Smart | F16L 3/02 248/68.1 |
| 7,475,513 B2 * | 1/2009 | Parker | F16L 3/1091 248/49 |
| 7,661,240 B2 * | 2/2010 | Sargent | F16L 3/137 248/146 |
| 7,731,131 B2 * | 6/2010 | Trueb | E04D 13/00 248/49 |
| 7,828,251 B2 * | 11/2010 | Tollefson | E04B 5/48 248/49 |
| 7,866,093 B2 * | 1/2011 | Krovats | E04D 13/12 52/24 |
| 7,918,429 B1 * | 4/2011 | Kleespie | B65D 90/12 220/571 |
| 7,922,130 B2 * | 4/2011 | Hawkins | F16L 3/00 248/346.01 |
| 7,942,371 B1 * | 5/2011 | McCoy | H02G 9/02 248/68.1 |
| 7,946,082 B2 * | 5/2011 | Ohkoshi | F24J 2/5205 248/237 |
| 8,181,916 B2 * | 5/2012 | Azuma | F16L 3/04 248/346.01 |
| 8,220,768 B1 * | 7/2012 | Cantolino | F16F 15/08 220/565 |
| 8,312,687 B2 * | 11/2012 | Yee | E04C 5/168 404/136 |
| 8,316,617 B2 | 11/2012 | Krovats | |
| 8,356,778 B2 * | 1/2013 | Birli | F16L 3/127 248/65 |
| 8,418,419 B1 * | 4/2013 | Aseere | F24J 2/5205 136/251 |
| 8,540,194 B2 * | 9/2013 | Azuma | F16L 3/24 248/68.1 |
| D692,393 S | 10/2013 | Hillman et al. | |
| 8,616,517 B2 * | 12/2013 | Huth | F01D 17/162 248/188.1 |
| 8,672,597 B2 * | 3/2014 | Selle | F16B 37/062 411/181 |
| 8,757,560 B2 * | 6/2014 | Darnell | H02G 3/0456 174/68.1 |
| 8,814,120 B1 * | 8/2014 | Kleespie | B65D 90/12 108/57.31 |
| 8,850,754 B2 * | 10/2014 | Rizzo | F16B 7/0446 136/251 |
| 8,910,448 B2 * | 12/2014 | Okada | F24J 2/5245 52/705 |
| 8,910,803 B2 * | 12/2014 | Holtby | F16L 1/0246 211/126.1 |
| 8,931,977 B2 * | 1/2015 | Connors | B23K 37/0533 405/184.4 |
| D738,711 S * | 9/2015 | Tally | E03C 1/021 D8/380 |
| 9,181,691 B2 * | 11/2015 | Thompson | E04B 1/4121 |
| D749,935 S * | 2/2016 | Rook | F16L 3/227 D8/349 |
| D767,796 S * | 9/2016 | Kinsman | E04F 15/02458 D25/133 |
| 9,528,271 B2 * | 12/2016 | Rook | E04H 12/12 |
| 9,726,303 B1 * | 8/2017 | Gretz | F16L 3/00 |
| D810,010 S * | 2/2018 | Rook | D13/102 |
| D824,749 S * | 8/2018 | Wright | B29C 69/001 D8/354 |
| 2003/0047658 A1 * | 3/2003 | Peter | F16M 11/22 248/346.01 |
| 2007/0045482 A1 * | 3/2007 | Smart | F16L 3/04 248/68.1 |
| 2007/0120036 A1 * | 5/2007 | Olle | F16L 3/24 248/615 |
| 2007/0187564 A1 * | 8/2007 | McGuire | E02D 27/42 248/346.5 |
| 2008/0054143 A1 * | 3/2008 | Collins | F16L 3/02 248/227.2 |
| 2011/0140412 A1 * | 6/2011 | Manser | F17C 13/084 285/192 |
| 2012/0025034 A1 * | 2/2012 | Turner | F16L 3/04 248/65 |
| 2012/0043445 A1 * | 2/2012 | Baechle | D06F 39/001 248/346.01 |
| 2014/0197282 A1 | 7/2014 | Turner | |
| 2014/0332641 A1 * | 11/2014 | Wilson | F16L 3/2235 248/71 |
| 2015/0028177 A1 * | 1/2015 | Vargas | B60S 9/02 248/542 |
| 2016/0123012 A1 * | 5/2016 | Francies, III | E04C 5/168 248/68.1 |

* cited by examiner

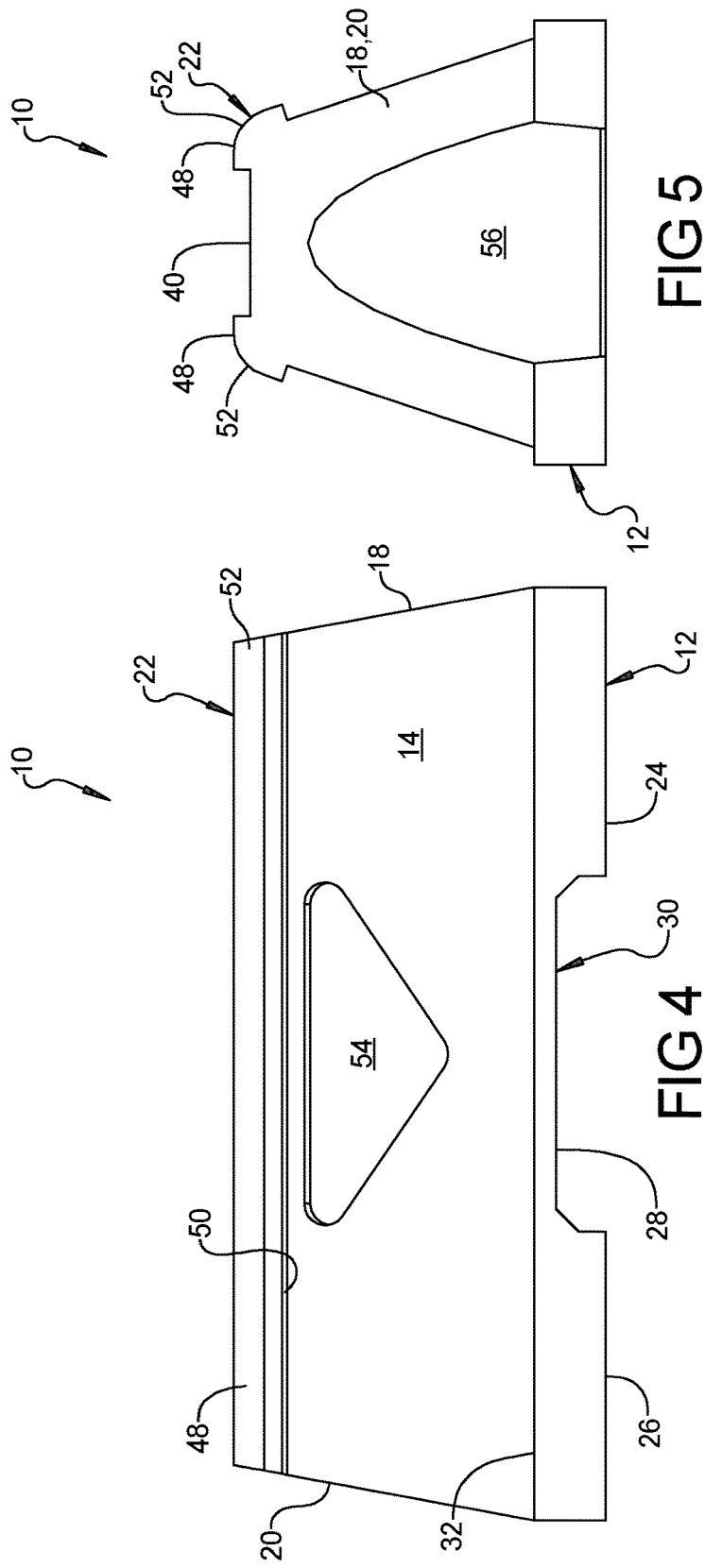

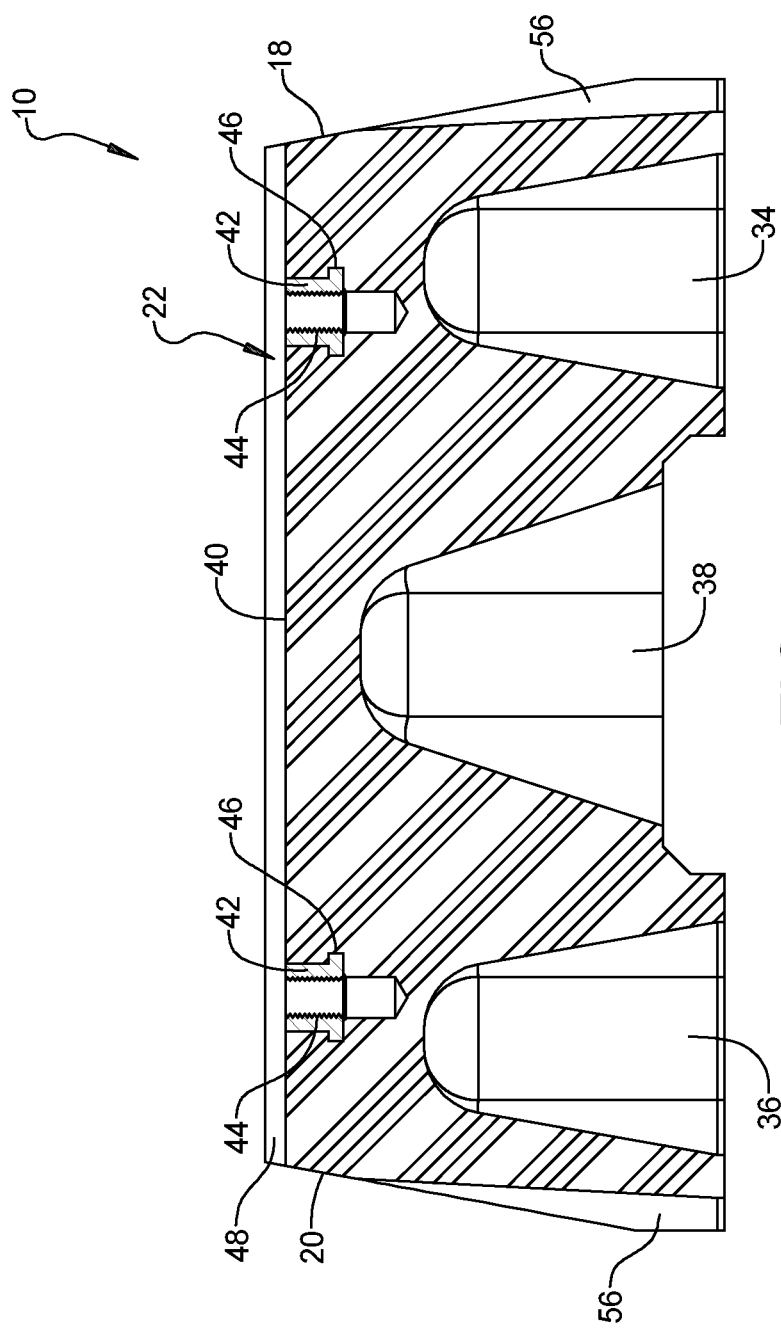

ROOFTOP SUPPORT SYSTEM

FIELD

The present disclosure relates to a rooftop support system including a support block.

BACKGROUND

This section provides background information related to the present disclosure which is not necessarily prior art.

Many features of modern construction provide convenience by allowing a party to simply and easily access items from a distant location. Examples of such devices include plumbing, heating, ventilating and air conditioning (HVAC) systems. In many of these instances, needed materials such as natural gas, electricity, water, and other items are transported from one location to another through a conduit. These conduits must be permanently attached in one location so as to support the conduit while preventing the conduit from being damaged or moved out of a desired alignment and position.

One of the ways in which this is done is through mounting devices that are mounted or secured in a desired location so as to support and maintain the stability of these devices. In mounting or securing such items there are several considerations that must be taken into account. Some of these considerations include the weight of the pipes on the roof, the weight of any associated HVAC system including evaporators or condensers that may be supported on the roof, the possible damage to the roof, and the environmental considerations in which the system will be placed. Mounting systems must have sufficient strength so as to support a designated item in a desired position and orientation upon a roof. Mounting systems must also be of a material that will not cause damage to the roof or floor, or other surface that underlies the position wherein the mounting system is placed. If damage to the surface were to occur, for example in the instance of a roof, damage to the underlying roof could cause additional damage to the interior of the building.

Various systems have attempted to address these problems. However, each of these systems has had inherent problems associated with them. One system that is employed utilizes the attachment of the tubing to wooden planks with unfinished metal clamps. This system has many limitations. One problem is that significant damage can be caused to the roofing material by wooden planks. This damage is incurred not only from the weight of materials but also by movement of the planks along the surface of the roof as the conduit connected thereto expands and contracts in response to various thermal conditions. Furthermore, in climates where the devices are exposed to water in various forms, the increased exposure to moisture causes the wood to rot and the unprotected metal to rust and therefore requires frequent replacement and repair. Another problem that exists is that the wooden planks must be shimmed or cut in order to accommodate various height and slope requirements depending upon the conduit that is being mounted. This requires that an installer not only bring all of the bulky wooden pieces and the metal connection parts with him/her onto the roof, but that he/she also bring tools with them so that they can cut, modify and construct bracing of various heights so as to allow for the proper installation of the conduits upon the designated surface.

Therefore what is needed is an improved system for mounting and placing conduits and pipes upon a building structure. What is also needed is a system and device that allows for variable forms of flexibility with pieces that are easy to carry, simple to use, and easy to install.

SUMMARY

This section provides a general summary of the disclosure, and is not a comprehensive disclosure of its full scope or all of its features.

The present disclosure provides a rooftop support system including at least one support block. The support block includes a base configured to rest on the rooftop, and the base has a first base section and a second base section separated by a U-shaped recess that defines a first gripping feature. The support block includes first and second sidewalls unitary with the base and extending along a length of the support block, and the first and second sidewalls each define a second gripping feature. The support block also includes third and fourth sidewalls unitary with the base and extending along a width of the support block, and the third and fourth sidewalls each define a third gripping feature. An upper surface of the support block defines an elongate channel, and a pair of apertures are formed in the elongate channel with a coupling feature embedded therein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 4 and 5 are side elevation views of the support block illustrated in FIG. 1;

FIG. 7 is a cross-sectional view of the support block of FIG. 6 taken along line A-A.

Corresponding reference numerals indicate corresponding parts throughout the several views of the drawings.

DETAILED DESCRIPTION

Figure 1:
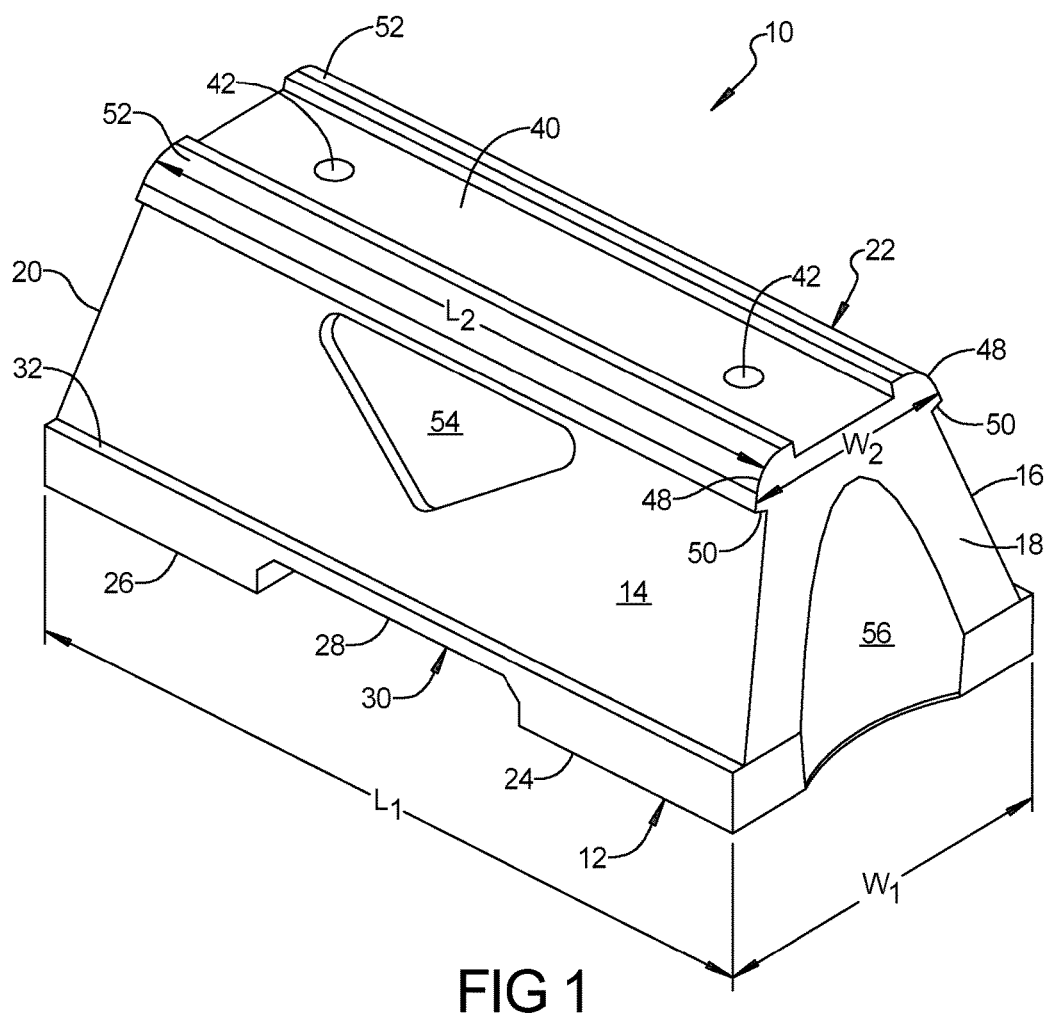
FIG. 1 is a perspective view of a support block according to a principle of the present disclosure.

Example embodiments will now be described more fully with reference to the accompanying drawings.

FIGS. 1-7 illustrate a support block 10 for use in a rooftop support system according to the present disclosure. Support block 10 may be formed from a variety of materials including polymeric materials such as rubber or plastic, or a mixture of materials such as wood pulp or cellulose that is intermixed with the polymeric material. When support block 10 includes a polymeric material, support block 10 is configured to dampen vibrations. Regardless of the material selected, support block 10 should be a substantially rigid member that can support the weight of various structures such as pipes, fluid conduits, HVAC structures, and the like. Further, inasmuch as support block 10 may be exposed to weather and the sun, the selected material should be water-resistant, and resistant to solar degradation.

Support block 10 includes a base 12, a first sidewall 14, a second sidewall 16, a third sidewall 18, a fourth sidewall 20, and an upper surface 22. Base 12 defines a first length L1 and a first width W1, while upper surface 22 defines a second length L2 and a second width W2. The first length L1 and first width W1 are greater than the second length L2 and second width W2, respectively. In this regard, the first, second, third, and fourth sidewalls 14-20 are each inclined.

Base 12 includes a first base section 24 and a second base section 26 that are separated by a U-shaped recess 28. U-shaped recess 28 defines a gripping feature 30 that allows support block 10 to be easily gripped and transported from one location to another. Moreover, U-shaped recess 28 allows for less material to be used when forming support block 10. Base 12 extends outward from first sidewall 14 and second sidewall 16 to define a ledge 32.

Figure 2:
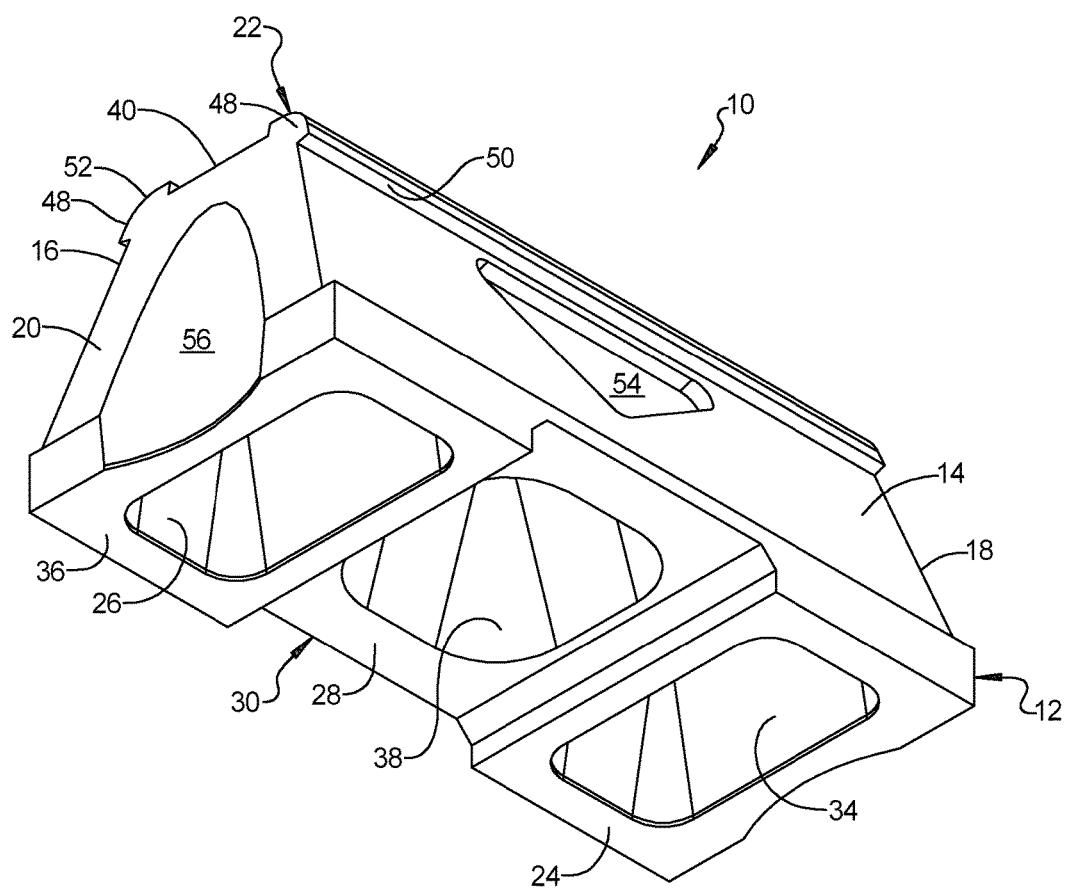
FIG. 2 is another perspective view of the support block illustrated in FIG. 1.
Figure 3:
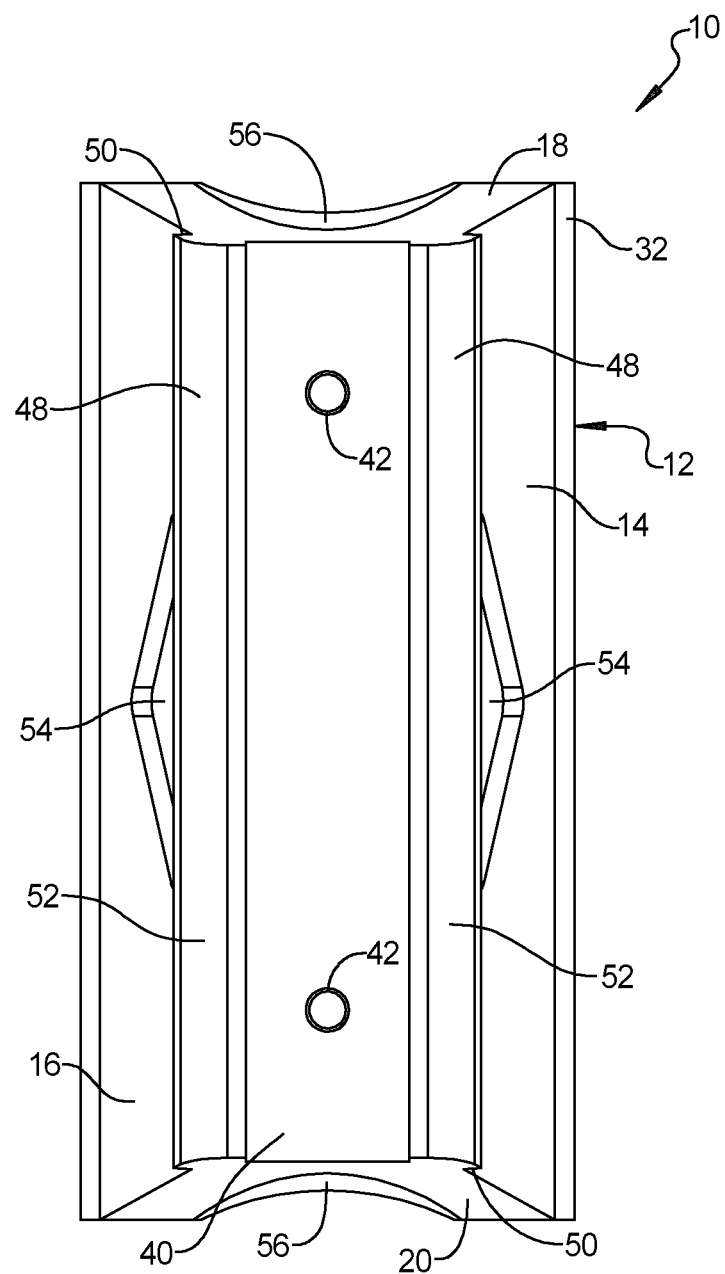
FIG. 3 is a top plan view of the support block illustrated in FIG. 1.
Figure 6:
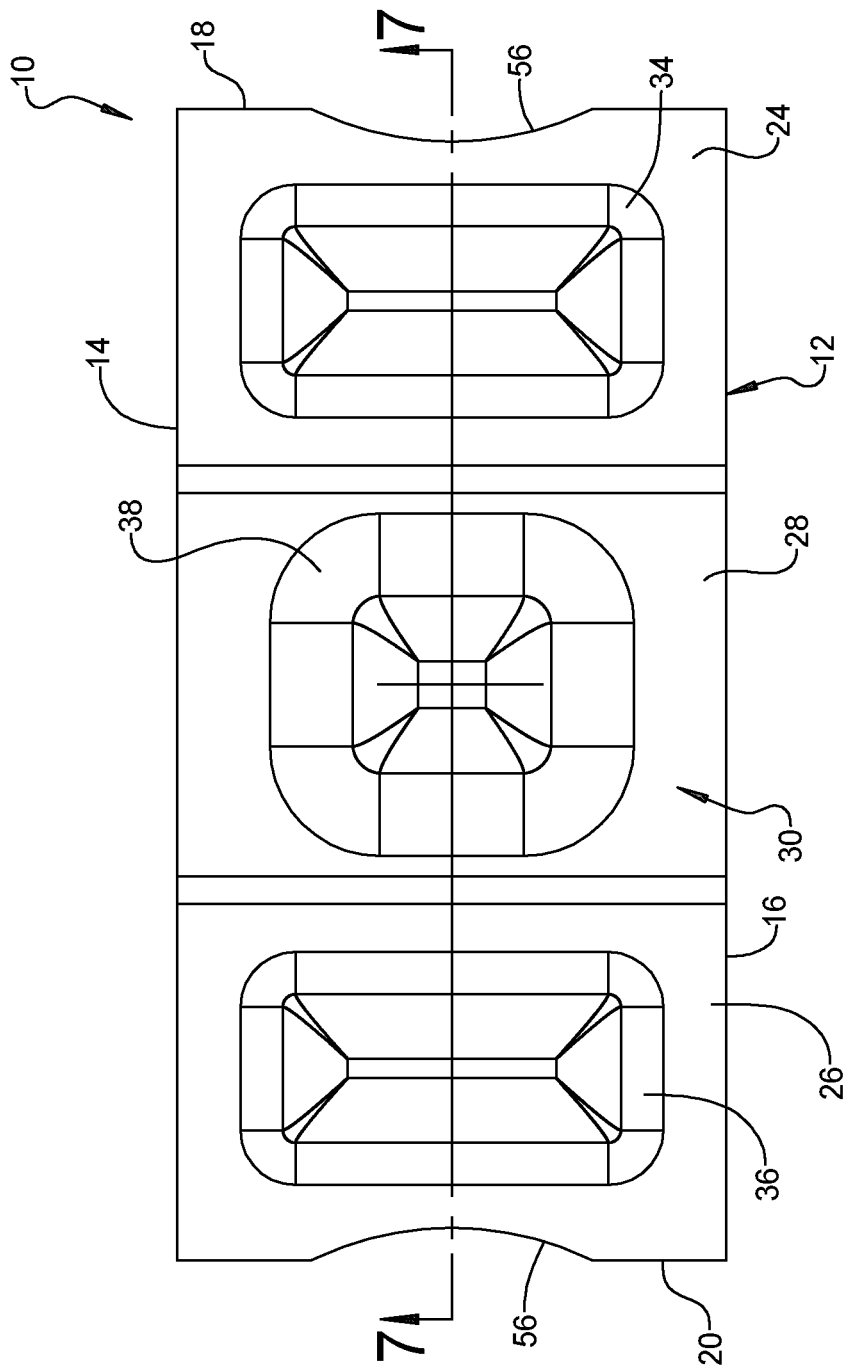
FIG. 6 is a bottom view of the support block illustrated in FIG. 1.

As best shown in FIG. 2, support block 10 includes a plurality of cavities 34, 36, and 38. A first cavity 34 is formed in first base section 24 and a second cavity 36 is formed in second base section 36. A third cavity 38 is formed in U-shaped recess. Cavities 34, 36, and 38 allow for less material to be used when forming support block 10. Moreover, it should be understood that a depth of cavities 34, 36, and 38 is variable when designing support block 10. In this regard, if support block 10 is to be used in supporting a very heavy object such as an HVAC apparatus, the depth of the cavities 34, 36, and 38 can be less than in an application where, for example, support block 10 is used to support a pipe or conduit. That is, during design of support block 10, the mass of support block 10 can be selected to be greater or lesser dependent on the application for which support block 10 will be used. It should also be understood that each cavity 34, 36, and 38 can have the same or different depths, as desired.

Upper surface 22 defines an elongate channel 40 having a pair of apertures 42 formed therein. Although channel 40 is illustrated as having only a pair of apertures 42, it should be understood that any number of apertures 42 can be formed in channel 40. Channel 40 is configured for receipt of a pipe, conduit, or some other portion of a structure that is to be supported by support block 10. Alternatively, channel 40 is configured to receive conventional channel bracket (not shown) that in turn is used in combination with support block 10 to support a pipe, channel or some other type of structure.

As best shown in FIG. 7, apertures 42 extend from channel 40 into an interior of support block 10. Further, apertures 42 include a coupling feature that may in the form of a threaded surface 44 that is provided by embedding a T-nut 46 or some other type of device having a threaded surface within support block 10. A bolt, strut, or some other type of fastener (not shown) can then be engaged with aperture, and used to couple the pipe, conduit or structure to support block 10, or the fastener (not shown) engaged with aperture 42 can be used to couple a channel support bracket (not shown) to support block 10. As illustrated, apertures 42 do not extend entirely through support block 10 or provide communication to one of the cavities 34, 36, and 38. It should be understood, however, that apertures 42 can extend entirely through support block 10 or communicate with one of the cavities 34, 36, and 38 without departing from the scope of the present disclosure.

A pair of sills or braces 48 are positioned on opposing sides of channel 40, and extend along an entire length of channel 40. Further, braces 48 extend outward relative to first and second sidewalls 14 and 16 to define a rim 50 that may serve as another gripping feature for lifting and transporting support block 10. Braces 48 are also designed to include an arcuate surface 52 that may be brightly colored to increase the visibility of support block 10 during use thereof.

To provide coloring to braces 48, or to any other part of support block 10, a polyurethane polymer is molded into support block 10 during manufacture of support block 10. Because the polyurethane polymer is applied during the molding process, no subsequent steps (such as painting, or applying an adhesive) are required to provide coloring to the support block 10 after it is formed. Moreover, because the coloring is provided during the molding process used to manufacture support block 10, a superior bond is formed between support block 10 and the polyurethane polymer that makes the color more resistant to being removed from support block 10 than a color that is provided, for example, by painting, adhesive, and the like.

First and second sidewalls 14 and 16 are substantially planar, with the exception of a triangular-shaped recess 54 formed therein. Triangular-shaped recess 54 provides yet another gripping feature that allows support block 10 to be lifted or moved. Although recess 54 is illustrated as being triangular, it should be understood that recess 54 can be any shape desired including circular, oval, rectangular, square, trapezoidal, and the like. As noted above, first and second sidewalls 14 and 16 are inclined such that the length L2 and width W2 of upper surface 22 are each less than the length L1 and width W1 of base 12. The angle of inclination can be any angle in the range of 5 degrees to 45 degrees.

Third and fourth sidewalls 18 and 20 are also inclined in the range of 5 degrees to 45 degrees. In addition, third and fourth sidewalls 18 and 20 includes a scallop-shaped recess 56 formed therein that forms yet another gripping feature. As best shown in FIGS. 1 and 5, scallop-shaped recess 56 is also formed in a portion of base 12. Although recess 56 is illustrated as being scallop-shaped, it should be understood that recess 56 (as well as recesses 28 and 54) can be other shapes without departing from the scope of the present disclosure. Further, it should be noted that recess 56 also reduces the amount of material that is needed to manufacture support block 10, and the size of recess 56 can be selected as desired.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A rooftop support system including at least one support block, the support block comprising:
    a base configured to rest on the rooftop, the base having a length and a width, and the base having a first base section and a second base section that each define a bottom surface of the support block and are separated in a length direction by an inverted U-shaped recess that is configured as a first gripping feature and extends across the entire width of the base;

first and second sidewalls unitary with the base and extending along the length of the support block, the first and second sidewalls each defining a second gripping feature;

third and fourth sidewalls unitary with the base and extending along the width of the support block, the third and fourth sidewalls each defining a third gripping feature;

an upper surface defining an elongate channel formed therein;

a pair of apertures formed in the elongate channel; and a coupling feature embedded in each of the apertures, wherein each of the first base section, second base section, and the inverted U-shaped recess include a cavity formed therein, a depth of each cavity being selected to adjust a mass of the support block, and wherein the apertures do not communicate with the cavities.

2. The rooftop support system according to claim 1, wherein the second gripping feature is a triangular-shaped recess formed in each of the first and second sidewalls.

3. The rooftop support system according to claim 1, wherein the third gripping features are defined by a scallop-shaped recess formed in each of the third and fourth sidewalls.

4. The rooftop support system according to claim 1, wherein the coupling feature is a threaded surface provided by a T-nut embedded in the apertures.

5. The rooftop support system according to claim 1, wherein the support block is formed of a water-resistant material.

6. The rooftop support system according to claim 1, wherein the upper surface includes a pair of braces that extend along a length of the elongate channel.

7. The rooftop support system according to claim 6, wherein the braces define an arcuate surface that is colored to increase visibility of the support block.

8. The rooftop support system according to claim 7, wherein the braces define a fourth gripping feature.

9. A rooftop support system including at least one support block, the support block comprising:

a base configured to rest on the rooftop, the base having a first base section and a second base section separated by an inverted U-shaped recess that is configured as a first gripping feature;

first and second sidewalls unitary with the base and extending along a length of the support block, the first and second sidewalls each defining a second gripping feature;

third and fourth sidewalls unitary with the base and extending along a width of the support block;

a pair of scallop-shaped recesses that are formed in the third sidewall and the first base section and the fourth side wall and the second base section, respectively, the scallop-shaped recesses defining a third gripping feature;

an upper surface defining an elongate channel formed therein;

a pair of apertures formed in the elongate channel; and a coupling feature embedded in each of the apertures, wherein each of the first base section, second base section, and the inverted U-shaped recess include a cavity formed therein, a depth of each cavity being selected to adjust a mass of the support block, and wherein the apertures do not communicate with the cavities.

10. The rooftop support system according to claim 9, wherein the coupling feature is a threaded surface provided by a T-nut embedded in the apertures.

11. The rooftop support system according to claim 9, wherein the support block is formed of a water-resistant material.

12. A rooftop support system including at least one support block, the support block comprising:

a base configured to rest on the rooftop, the base having a first base section and a second base section separated by an inverted U-shaped recess that is configured as a first gripping feature;

first and second sidewalls unitary with the base and extending along a length of the support block, the first and second sidewalls each defining a second gripping feature;

third and fourth sidewalls unitary with the base and extending along a width of the support block, the third and fourth sidewalls each defining a third gripping feature;

an upper surface defining an elongate channel formed therein, the upper surface including a pair of braces that extend along length of the support block to define the elongate channel; wherein each brace extends laterally outward from of the first and second sidewalls, respectively, to define a fourth gripping feature;

a pair of apertures formed in the elongate channel; and a coupling feature embedded in each of the apertures.

13. The rooftop support system according to claim 12, wherein the coupling feature is a threaded surface provided by a T-nut embedded in the apertures.

14. The rooftop support system according to claim 12 wherein each of the first base section, second base section, and the inverted U-shaped recess include a cavity formed therein, a depth of each cavity being selected to adjust a mass of the support block.

15. The rooftop support system according to claim 14, wherein the apertures do not communicate with the cavities.

16. The rooftop support system according to claim 12, wherein the support block is formed of a water-resistant material.

* * * * *